United States Patent
Gifford et al.

(10) Patent No.: US 7,937,177 B2
(45) Date of Patent: May 3, 2011

(54) MANUFACTURING WORK IN PROCESS MANAGEMENT SYSTEM

(75) Inventors: Jeffrey P. Gifford, Fishkill, NY (US); Roger M. Young, Warwick, NY (US)

(73) Assignee: International Business Machines Corporation, Armonk, NY (US)

( * ) Notice: Subject to any disclaimer, the term of this patent is extended or adjusted under 35 U.S.C. 154(b) by 979 days.

(21) Appl. No.: 11/769,144

(22) Filed: Jun. 27, 2007

(65) Prior Publication Data

US 2009/0005896 A1    Jan. 1, 2009

(51) Int. Cl.
*G06F 19/00* (2006.01)

(52) U.S. Cl. .......................... 700/100; 700/103; 700/105

(58) Field of Classification Search .................... 700/95, 700/97, 99–103, 105, 106, 108, 213, 228
See application file for complete search history.

(56) References Cited

U.S. PATENT DOCUMENTS

| | | | | |
|---|---|---|---|---|
| 5,721,686 A * | 2/1998 | Shahraray et al. | ............ | 700/102 |
| 6,259,959 B1 * | 7/2001 | Martin | ............ | 700/99 |
| 6,647,307 B1 * | 11/2003 | Huang et al. | ............ | 700/102 |
| 6,684,121 B1 * | 1/2004 | Lu et al. | ............ | 700/108 |
| 6,714,830 B2 * | 3/2004 | Browning | ............ | 700/102 |
| 6,748,287 B1 * | 6/2004 | Hagen et al. | ............ | 700/99 |
| 6,922,600 B1 * | 7/2005 | Conrad et al. | ............ | 700/108 |
| 7,027,884 B2 * | 4/2006 | Watanabe et al. | ............ | 700/97 |
| 7,072,731 B1 * | 7/2006 | Barto et al. | ............ | 700/102 |
| 7,072,732 B2 * | 7/2006 | Muramatsu et al. | ............ | 700/103 |
| 7,296,103 B1 * | 11/2007 | Purdy et al. | ............ | 710/106 |
| 7,337,032 B1 * | 2/2008 | Nettles et al. | ............ | 700/100 |
| 7,460,920 B1 * | 12/2008 | Qu et al. | ............ | 700/101 |
| 7,477,957 B2 * | 1/2009 | Burda et al. | ............ | 700/101 |
| 7,480,538 B2 * | 1/2009 | Volant et al. | ............ | 700/99 |
| 7,529,695 B2 * | 5/2009 | Yang et al. | ............ | 705/28 |
| 7,653,451 B2 * | 1/2010 | Denton et al. | ............ | 700/99 |
| 2004/0098403 A1 * | 5/2004 | Gupta et al. | ............ | 707/102 |
| 2008/0077273 A1 * | 3/2008 | Gifford et al. | ............ | 700/228 |

FOREIGN PATENT DOCUMENTS

JP    2000141163 A  *  5/2000

* cited by examiner

*Primary Examiner* — Crystal J Barnes-Bullock
(74) *Attorney, Agent, or Firm* — H. Daniel Schnurmann

(57) ABSTRACT

A method for addressing high Work In Process (WIP) conditions for increasing throughput while minimizing risk in a manufacturing line. Selected products to be skipped over during high WIP conditions include determining toolsets having work in process exceeding a certain threshold. For each of the toolsets, products which meet a criteria for skipping are selected. The selected products skip over to the toolset used in a subsequent process step ahead of product failing to meet the criteria for skipping. Solutions to this problem also include the WIP of the current process step, nominal WIP and WIP of subsequent process steps. Candidate lots for skipping process steps are identified by referencing a matrix of parameters that includes yield and criticality.

20 Claims, 2 Drawing Sheets

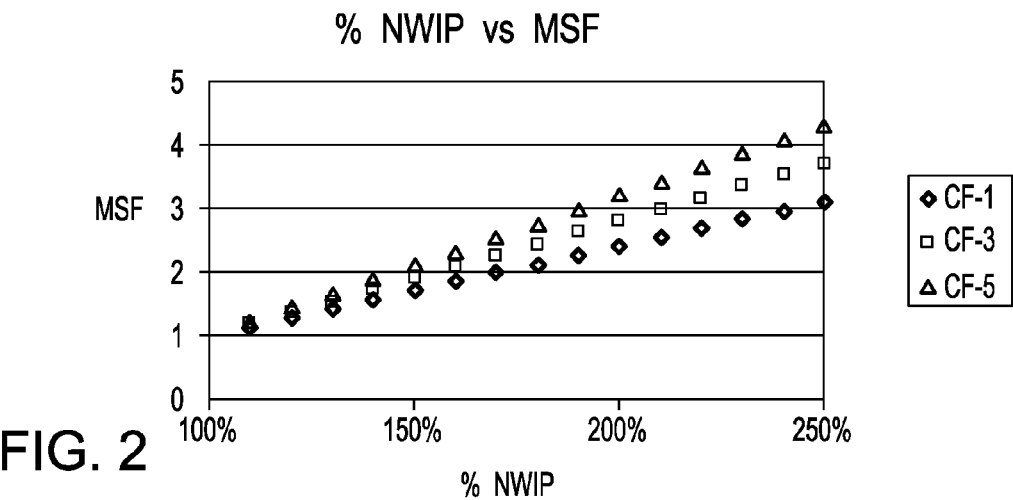
FIG. 1
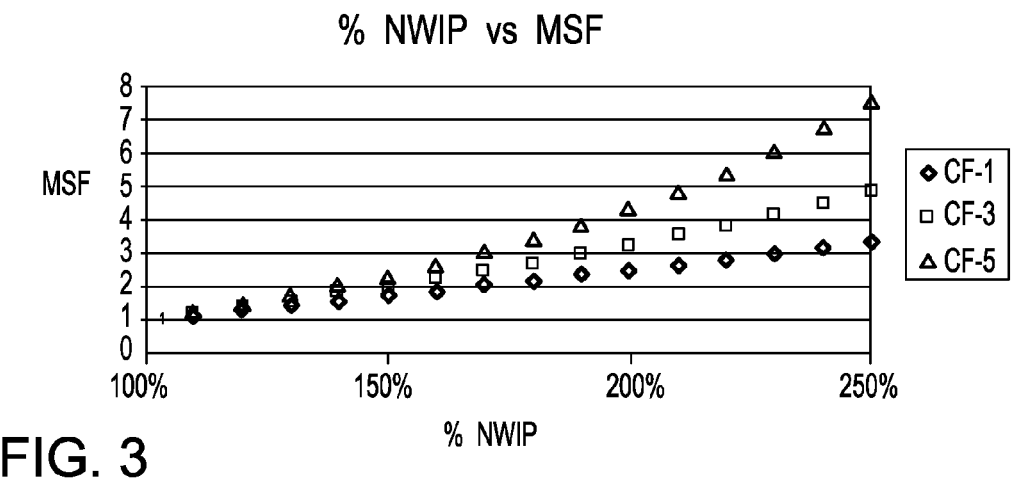
FIG. 2
FIG. 3

MANUFACTURING WORK IN PROCESS MANAGEMENT SYSTEM

FIELD OF THE INVENTION

This invention is generally related to a management system, and more particularly, to a system and a method for increasing the utilization of manufacturing resources in response to Work in Process (WIP) requirements.

BACKGROUND OF THE INVENTION

High volume manufacturing requires efficient utilization of all manufacturing resources. This entails smart systems that easily adapt to changes in a manufacturing line due to a variety of factors including tool down situations, high WIP requirements and quality concerns.

On occasion, a production line experiences what is termed a Work In Process (WIP) bubble, i.e., an imbalanced distribution of the work in process, as a result of a variety of reasons which are difficult to predict. These include, but are not limited to, unscheduled tool down conditions, recipe inhibits and processing abnormalities affecting rework. Due to the dynamic environment of the production line, an automated system is needed to intelligently manage WIP bubbles when disruptions occur.

In most manufacturing lines, the product is evaluated by performing specific quality measurements following certain production processes. Measurements that quantify the aforementioned process are referred to as metrology. For certain processes, only a small sample of the product is subject to a metrology measurement. In others, all the products are measured depending on area specific parameters of the process in question. By modifying the sample rates of the metrology measurements, it is possible to quickly address and react to WIP bubbles, reducing their impact on the manufacturing line.

In a semiconductor manufacturing environment, metrology sampling rates are established for various process operations. The sampling rates may fluctuate depending upon a variety of factors, such as the criticality of the particular process, e.g., gate etch processes, stability of the process operations in terms of controllability, and the like. Metrology sampling rates are typically set below a level where the aggregate of all of the products selected for sampling will completely utilize all the available metrology capacity. This is generally referred to as the baseline sampling rates. Baseline sampling rates are advantageously set lower than maximum levels to allow the metrology tools to "catch-up" to accumulated WIP after one or more of the metrology tools have been taken out of service for a variety of reasons, such as routine maintenance, unscheduled problems with one of the metrology tools, etc. For example, if one of four available metrology tools are taken out of service, the work-in-progress (WIP) will slowly accumulate in the metrology queues until the out-of-service metrology tool is returned to service. At that time, all the remaining available metrology tools will operate at higher than normal utilization rates until the queues are reduced to normal.

Generally, when one or more metrology tools are taken out of production, the sampling rates may be manually lowered to reduce the amount of WIP accumulating in the metrology queues. Under this scheme, when the out-of-service metrology tool(s) returns to production, the sampling rates return to their normally high levels.

Another technique, referred to as an adaptive sampling technology, is intended to improve the efficiency of the factory. The key to addressing this issue is the ability to strike a balance between measurement needs of automated control and factory monitoring systems and the needs of the factory management to make the most effective use of available factory resources.

"Adaptive sampling" refers to an efficient and effective use of metrology sampling capacity. The finite metrology capacity of the factory is allocated to those measurements that provide the best actionable data for the factory. Sampling plans have been in place for years, typically allocating higher sampling rates to some processes rather than others.

Measurements of processes with small process windows or those displaying a high correlation to end-of-line yield may be given higher percentages than other, less critical measurements. Operations having a high wafer-to-wafer variability may measure more wafers but a smaller percentage of lots. While these strategies are effective to provide data they are designed to collect, they have the fundamental problem of being static—and modern factories are anything but static. Thus, truly efficient sampling strategies must be able to adapt to the changing factory dynamics.

Responding to customer demands for new technologies or product distributions creates another need for adaptive sampling methodologies. As new products are introduced, sampling rates must be comparatively high (up to 100% of the lots, in some cases) to ensure that enough data is collected to accurately target and manufacture the product when it is run in volume. However, maintaining a high level of sampling when the product is in full production is often unfeasible due to limited metrology capacity. Likewise, it is also often unnecessary as the volume of material being processed can provide an adequate stream of data for monitoring and control.

This type of adaptation to product life cycles was previously done manually and, as such, was rife with inefficiencies. Frequently, adaptation occurred only when a new product high sampling rate caused capacity issues (with resulting cycle-time penalties). Sampling rates for products required to be different for various portions of the production line. Alternatively, a product in a declining volume mode at lot start could still be a dominant product at the back-end-of-line.

Accordingly, an adaptive sampling system coupled to the WIP management system is required that takes all of these factors into account and implements appropriate sampling strategies. In view of the ever changing manufacturing environment, a need remains in industry for a system and a method capable of achieving dynamic sampling and of automatically increasing the utilization of manufacturing resources in response to WIP requirements.

OBJECTS AND SUMMARY OF THE INVENTION

Thus, it is an object of the invention to provide a method and a system that dynamically adjusts the metrology sampling based upon the available metrology capacity.

It is another object to provide a method capable of altering the workflow based on a high WIP condition and utilizing step criticality metrics to determine the lot skipping criteria.

It is still another object to provide a method capable of sampling a product based on WIP or criticality metrics in the presence of continuous dynamic changes to the sampling rates based on predetermined metrics.

It is a further object to identify candidate lots for skipping based on the comparison of the cumulative queue time of a current toolset to subsequent ones, such that only lots having a cumulative queue time for the current toolset that is greater than that for the subsequent toolset are identified as candidate lots.

It is a still a further object to identify candidate lots for skipping based on a comparison of the cumulative queue time of the current toolset to the subsequent toolset, where only lots having a cumulative queue time for the current toolset that is greater than that for the subsequent toolset are identified as candidate lots.

These and other objects, aspects and advantages of the invention are provided by a method that includes a metrology control unit that is adapted to a baseline metrology sampling rate for a given operation; and determining the available metrology capacity of the control unit, such that it establishes a new sampling rate based upon the available capacity.

A preferred embodiment of the invention described a method that utilizes a dynamic skip rate that is dynamically adjusted based on a variety of factors in an environment where not all the lots have the same skip rate depending on the criticality and yield of the step in question. Hence the proposed method continually monitors the WIP in front of defined toolsets and adjusts the skip rate accordingly.

In an aspect of the invention, the method can reference yield (Cpk) data if desired, in addition to other factors, including WIP and measurement criticality, resulting in a self-balancing sampling system that takes into account both quality and productivity metrics.

The process of identifying candidate lots, defining lots to be skipped via the lot skip operation, and the skip lot evaluation can be performed as often as desired by the production line. Since the process described lends itself to a fully automated system it can advantageously run using an automated trigger. The optimal trigger rate of performing this process actually depends on how the size of the WIP bubble responds to the lot skipping process. If the WIP bubble increases, then the trigger rate may increase to run every time a new lot enters the queue of the current toolset. Alternatively, if the WIP bubble decreases as expected then the trigger rate may decrease to run after every two or three lots that enter the queue of the current toolset. At some point, the WIP bubble is eliminated and the queue in front of the current process step achieves a normal level, in which case the process is deactivated and the normal process is reinstated.

In another aspect of the invention, there is provided a method of increasing throughput while mitigating risk in a manufacturing line by selecting products to be skipped over during high Work In Process (WIP) conditions, the method including the steps of:
(a) determining manufacturing toolsets having work in process above a predetermined threshold;
(b) for each toolset, determining the products which meet a criteria for skipping; and
(c) forwarding the products meeting the criteria for skipping to the toolset used in a subsequent process step ahead of the product failing to meet said criteria for skipping.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention.

FIG. 1 illustrates a list of a lot priority for a toolset initially with the highest priority lot starting at a given lot, and then moving toward lower priority lots with the lowest priority lot.

FIG. 2 illustrates a graph of the Modified Scale Factor (MSF) as a function of the percent Nominal Work In Process (% NWIP), wherein the equation used to generate the MSF results in a linear increase in the skip rate.

FIG. 3 illustrates a graph of the Modified Scale Factor (MSF) as a function of % NWIP percent Nominal Work In Process (% NWIP), such that the equation used to generate the MSF results in an exponential increase in the skip rate.

DETAILED DESCRIPTION OF PREFERRED EMBODIMENTS

Figure 4:
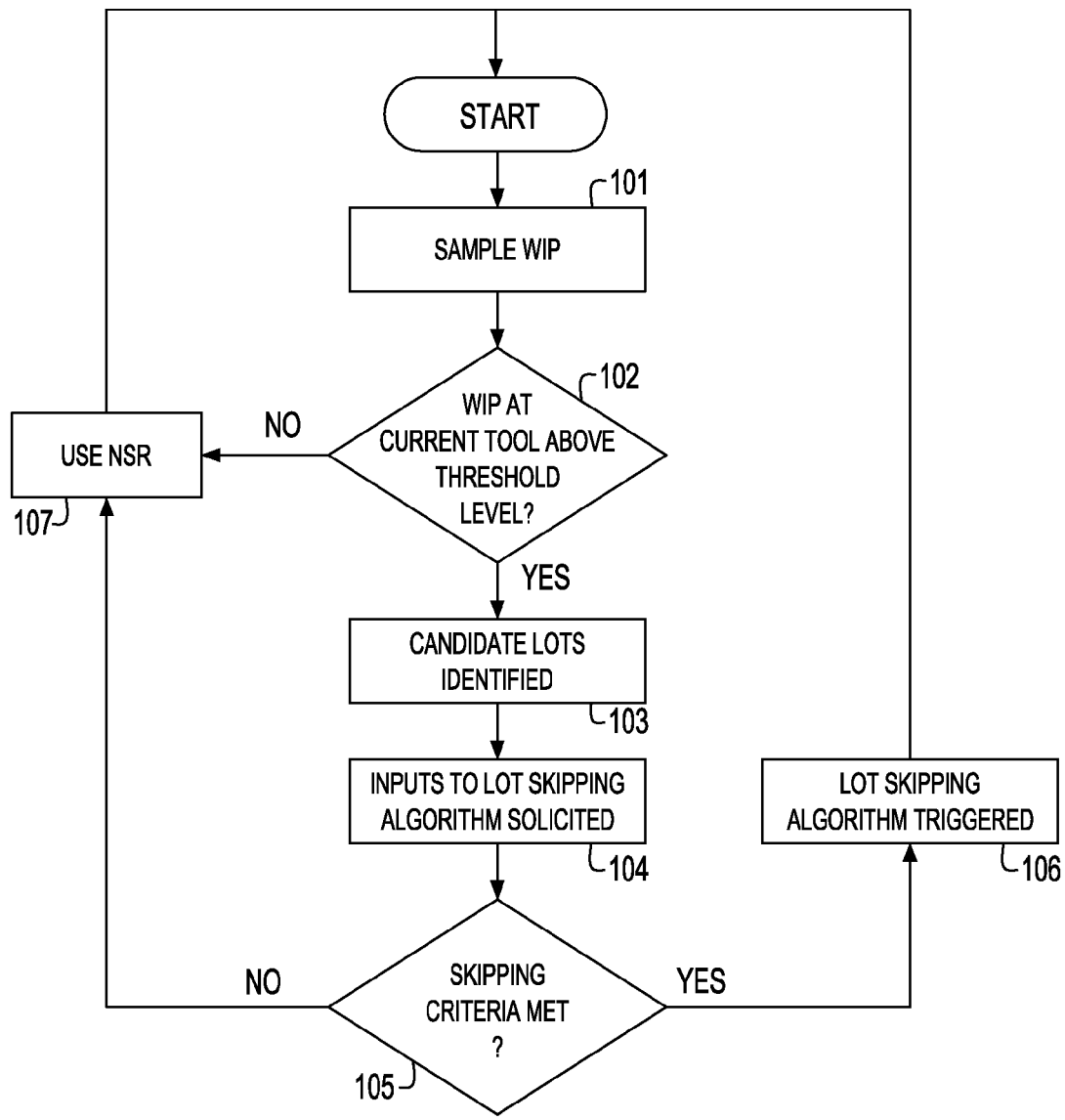
FIG. 4 is a flow chart illustrating a preferred embodiment of the present invention.

The present invention and the various features and advantageous details thereof are explained more fully with reference to the non-limiting embodiments that are illustrated in the accompanying drawings and detailed in the following description.

A preferred embodiment will now be described with reference to FIG. 4 that shows an illustrative flowchart to be taken in conjunction with FIGS. 1 through 3 that graphically illustrate the results of executing the various steps illustrated in the aforementioned flow chart.

Prioritization of WIP:

Referring now to FIG. 4, a periodic sampling of WIP (FIG. 4, step 101) monitors the amount of WIP at each process and/or measurement step in the production line. Following the sampling of WIP, the data is preferably reviewed (FIG. 4, step 102) to determine if a high WIP situation exists at any point of the production line. High product WIP build up in view of specific processes and/or measurement steps in a production route are referred to as a WIP bubble. To most effectively address this situation and keep the production line running smoothly, the WIP in each WIP bubble must be prioritized to identify candidate lots (FIG. 4, step 103) for skipping. In the case where the current toolset consists of multiple tools, the WIP must be prioritized in view of each tool in the toolset to initially process the highest priority lots.

To further illustrate the handling of the lot prioritization, a list of a lot priority for the entire toolset is shown in FIG. 1, with the highest priority lot starting at lot 'A' and moving toward lower priority lots with the lowest priority lot being lot 'G'. Once this is accomplished, the lot process order by tool is determined. This is based on the expected process time required for each lot combined with the tool availability. For illustrative purposes, it is assumed that the process time for each lot is equal.

Still referring to FIG. 1, two general principles are illustrated therein. The top drawing represents multiple lots in the queue for a toolset. The highest priority lot denoted as 'A' is followed by the second highest priority lot denoted as 'B', etc. ... all the way to the lowest priority lot denoted as 'G'. The middle and bottom drawings represent these same lots in the queue for each tool of the toolset. (tool 1 & tool 2) The queue for each tool results in having the highest priority lots being processed first followed by the next highest priority lots, all the way to the lowest priority lot. Assuming that the process time for each lot is identical, if the process time for each lot was not identical, then the queue for each tool may be different in order to achieve the goal of the highest priority lots being processed through the toolset before the lower priority lots.

The top row referred to 'Lot priority by toolset' is a representation of the WIP in the queue for the toolset arranged in order of priority with lot 'A' being the highest priority lot and lot 'G' being the lowest.

The second and third rows referred to 'Lot process order by tool' represent the same WIP for the toolset in front of each tool forming a toolset arranged such that the highest priority lot will start processing before the lower priority lots. The queue for each tool must take into account the expected process time for each lot in order to achieve this goal. Hence, if lot 'A' takes the same amount of time to process as lots 'B' and 'C', then the queue for tool 2 will be different, since lot 'B' will be first for tool 2 and is immediately followed by lot 'C', etc.

Identification of Candidate Lots:

Once WIP is prioritized for each tool of the current metrology toolset, candidate lots for skipping (FIG. 4, step 103) past the current metrology step need to be identified.

Each lot in the WIP bubble in front of the current metrology toolset is evaluated, identifying those lots where the sum of the queue time for each lot to be measured ahead of the lot under consideration, referred to as the target lot, exceed the sum of the time required for the target lot to be transported and processed by the subsequent toolset.

Still referring to FIG. 1, a sample calculation of the cumulative queue time for each lot of the current toolset will be discussed hereinafter.

Assuming that lots A and B are both next to be processed, with lot A to be processed on tool 1 and lot B to be processed on tool 2. The queue time for lot A is calculated by taking the sum of:

the time required for the lot currently processing on tool 1 to complete; and the time required to unload the lot from tool 1.

The queue time for lot B is calculated in similar fashion except the lot processing on tool 2 (referenced hereinafter as the queue time for lot B) and is calculated by taking the sum of:

the time required for the lot currently processing on tool 2 to complete; and the time required to unload the lot from tool 2.

Lot C is evaluated next. The queue time for lot C is calculated by taking the sum of:

the time required for the lot currently processing on tool 1 to complete;

the time required to unload the lot from tool 1;

the time required for lot A to process on tool 1; and the time required to unload lot A from tool 1.

The queue time for lots D, E, F, and the like, are calculated in a similar manner.

The method for determining the queue time for each lot in the subsequent toolset is similar to the method for determining the queue time for the current toolset. First, the target lot in the current toolset is identified. The total queue time for the target lot for a subsequent toolset is then determined by prioritizing all of the lots currently in queue for the subsequent toolset including the target lot. The sum of the process time(s) and the unload time(s) is calculated using the same logic as used for the current toolset. The total queue time for the subsequent toolset is determined for each lot in the current toolset in this fashion. Finally, the lots in the current toolset where the cumulative current process time exceeds the cumulative subsequent process time are identified as candidate lots to be evaluated using a special lot skipping algorithm.

Lot skipping is required to minimize the effect of a WIP bubble by moving product through non essential processes. This results in a reduction of tool loading without compromising the integrity of the production line.

Lots Skipping Algorithm:

Once the candidate lots for skipping have been identified (FIG. 4, step 103), a specific logic is applied to skip lots in the most efficient method possible. The skipping operation (FIG. 4, steps 104 and 105) utilizes the following equation and metrics: combining the metrics using many methods to yield lots which are to skip the current process step. A preferred method is described hereinafter.

$$MSR = NSR \times MSF$$

MSR=Modified Skip Rate—defined as the skip rate for the lots in queue after taking into account the Nominal Skip Rate and the Modified Scale Factor.

NSR=Nominal Skip Rate—defined as the skip rate utilized for normal processing.

MSF=Modified Scale Factor—defined as a value greater than or equal to 1 with 1 being utilized for normal processing and a value larger than 1 utilized in situations with excess WIP.

The novelty of the present method is the reference of current WIP levels in conjunction with other quality measures to define the optimal sample rate for measurements in order to maintain adequate monitoring and minimizing the effect of the WIP bubble.

Description of the Algorithm

When the current WIP exceeds nominal WIP conditions by a predetermined amount, e.g., 10%, then a new skip rate is invoked to reduce the WIP bubble most efficiently. The rules that preferably determine which candidate lots are to be skipped are based on several factors that include, but are not limited to:

Quantity of WIP at the step in question

Criticality of the measurement

Yield of the current measurement

One method for generating MSF is by way of data obtained via line metrics that is, preferably, generated automatically.

Referring now to TABLE I below, there is shown an example of a matrix which contains line metrics including 'WIP' (Work In Process), 'Yield', and 'Criticality', which may be a manually entered value or generated automatically. Other metrics may include revenue and the like. These metrics are standard metrics that are straight forward and which can be generated in any automated facility.

Shown below is a sample matrix of the Line Metrics and Modified Scale Factor (MSF). The column on the right side corresponds to MSF, which is a function of the line metrics listed in the same row.

TABLE I

| WIP | Criticality (1-5) | Yield (0%-100%) | MSF |
| --- | --- | --- | --- |
| 10% > NWIP | 3 | 20% | 1.18 |
| 20% > NWIP | 3 | 20% | 1.36 |
| 30% > NWIP | 3 | 20% | 1.54 |
| ... | | | |
| 10% > NWIP | 5 | 20% | 1.22 |
| 20% > NWIP | 5 | 20% | 1.44 |
| 30% > NWIP | 5 | 20% | 1.66 |
| ... | | | |

The MSF calculation is determined by how fast WIP is to be reduced. This is referred to in terms of NWIP (Nominal Work In Process) and % NWIP (Percent Nominal Work In Process). If the current WIP increases past NWIP, MSF increases in order to skip more lots thus reducing the WIP for the process step back to a nominal level. The key factor involved in how aggressive the lot skip engine will ramp up based on the state of the manufacturing line.

Generally, a greater change in MSF leads to a greater MSR. MSF can be linear (FIG. 2) or exponential (FIG. 3), if desired, depending on the manufacturing line where the proposed method is implemented. A possible method for calculating MSF using a linear model is provided by the following equation:

$$MSF = 1 + A + A*(B/5 + C)$$

A=Percentage of NWIP/100
B=Criticality (range of 1 to 5)
C=Process Yield %/100

TABLE I illustrates MSF based on the above equation. The value of the scale factor increases at a greater rate depending on the value of each of the critical parameters, as illustrated in FIG. 2, which shows a graphical representation of the data.

Criticality: Calculated based on the results of In Line Test data. (1=most critical to 5=least critical) and can be generated automatically or manually.

Yield: Calculated based on the results from lots that measure in specification vs. lots that measure those that are out of specification (OOS) for the step in question. These results are preferably generated automatically.

Another embodiment utilizes an exponential equation such as the following:

$$MSF = 1 + A + \exp(A*((B/5) + (C)))$$

This equation results in a more aggressive lot skipping plan, with more weight placed on the criticality factor of the measurement.

Referring to FIG. 3, a graphical representation of the MSF (Modified Scale Factor) vs. % NWIP (Percent of Nominal Work-In-Process) is illustrated indicating an exponential increase in the MSF as a function of % NWIP that is significantly more aggressive than the lot skipping illustrated in FIG. 2. This implies that a higher percentage of WIP is skipped when current WIP levels are above NWIP as compared to the linear model illustrated in FIG. 2. The choice of the equation to use, i.e., linear vs. exponential, depends on the characteristics of the process for which it is implemented. For example, a process step which builds WIP very fast will most likely utilize a model which will skip WIP faster than a process step which does not build WIP very fast.

An efficient model to use depends on the production environment. Manufacturing lines having a high throughput will most likely utilize a more aggressive skip plan while others may utilize a linear approach. It is entirely possible a single production line may utilize both methods for different process areas depending on the throughput and capacity constraints.

Skip Lot Evaluation:

The results of the lot skip operation results in a lot population which is to be skipped to the subsequent process step. (FIG. 4, step 106). Before performing this step, a final test is performed to confirm that if the defined population of lots is skipped to the subsequent process step at the same time where the cumulative process time of the current toolset for each lot is greater than the cumulative process time for the subsequent process step. Only those lots that meet this test are skipped to the subsequent toolset. Lots that fail this test remain in queue at the current process step (FIG. 4, step 107).

Still referring to the flow chart of FIG. 4, a summary of the entire process will now be provided.

In step 100, the process starts with the assumption that the production line is in operation and product is being processed.

In step 101 the WIP is sampled throughout the production line product flow.

In step 102 the results of the WIP sampling from step 101 are analyzed and any WIP bubbles in the production line are identified. If no WIP bubble is observed then the logic proceeds to step 107 resulting in the utilization of a nominal skip rate. If a WIP bubble is observed then the logic proceeds to step 103 with the identification of candidate lots for lot skipping.

In step 103 the sampling data is further processed to evaluate the cumulative process time for each waiting in the current toolset and comparing each value to the cumulative process time required for processing in the subsequent toolset. Those lots whose cumulative process time required for the current toolset exceed the cumulative time for the subsequent toolset are classified as candidate lots for skipping.

In step 104 the candidate lots are further evaluated based on line metrics as described previously in FIG. 2.

In step 105 those candidate lots which meet the criteria for lot skipping proceed to step 106 where the lot skipping operation is triggered resulting in the lots being skipped to the subsequent process step. Those lots that do not meet the lot skipping operation proceed to step 107 where the nominal skip rate is maintained.

The entire process is then repeated starting with a sampling of the production line WIP.

Finally, the present invention can be realized in hardware, software, or a combination of hardware and software. The present invention can be realized in a centralized fashion in one computer system or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation of a set of instructions intended to cause a system having an information processing capability to perform a particular function either directly or after conversion to another language, code or notation and/or reproduction in a different material form.

While the present invention has been particularly described in conjunction with exemplary embodiments, it is evident that many alternatives, modifications and variations will be apparent to those skilled in the art in light of the present description. It is therefore contemplated that the appended claims will embrace any such alternatives, modifications and variations as falling within the true scope and spirit of the present invention.

The invention claimed is:

1. A method of increasing throughput while mitigating risk in a manufacturing line by selecting products to be skipped over during high Work In Process (WIP) conditions, the method comprising the steps of:
   (a) determining toolsets having work in process exceeding a predetermined threshold;
   (b) for each of the toolsets, selecting the products which meet a criteria for skipping; and
   (c) having the selected products skip over to the toolset used in a subsequent process step ahead of the product failing to meet said criteria for skipping.

2. The method of claim 1, wherein in step b) skipping over the selected products further comprise the steps of:

(b1) comparing a queue time of the product to be skipped for a current process step to the queue time for the same product in a subsequent process step;

(b2) identifying the product where the subsequent queue time for the current process step is greater than the queue time for the subsequent process step; and (b3) skipping over the identified product and selecting another product to be evaluated.

3. The method of claim 2 wherein having the product skip past the current process step further comprises evaluating candidate products thereof using predetermined metrics.

4. The method of claim 3 wherein said predetermined metrics are selected from a group consisting of yield, criticality, WIP, and revenue, and any combination thereof.

5. The method of claim 4, wherein said predetermined metrics are determined for each product and are weighted and compared against predetermined limits.

6. The method of claim 5, wherein when the product has a metric falling within an acceptable range of the predetermined limit, the product is then flagged for evaluation.

7. The method of claim 6, further comprising:
   i) combining the metrics of each product being evaluated into an equation that includes the selected metrics;
   ii) utilizing the equation to generate a Modified Scale Factor (MSF) for each of the products being evaluated;
   iii) utilizing the resultant MSF to formulate a Modified Skip Rate (MSR); and
   iv) applying the resultant MSR to identify the products to be skipped over.

8. The method of claim 7 wherein the product to skip past the current process step is achieved by evaluating the candidate product resulting from the selected metrics that includes criticality.

9. The method of claim 8, further comprising:
   (a) determining a criticality metric for each of the resultant products; and
   (b) utilizing the criticality metric to generate the MSR for each of the resultant products.

10. The method of claim 7, further comprising selecting the product to skip over past the current process step by evaluating the candidate product that uses metrics that include determining by how much a current WIP exceeds a nominal WIP (% NWIP).

11. The method of claim 10, wherein after determining by how much the current WIP exceeds % NWIP for the current process step, the % NWIP metric generates an MSR for each of the selected products.

12. The method of claim 10, wherein for each process step, yield is determined based on results from lots that remain within specification compared to lots that measure outside the specification.

13. The method of claim 10 further comprising the step of utilizing a combination of metrics selected from a group consisting of WIP, Yield and Criticality to generate a MSF.

14. The method of claim 10 further comprising evaluating the products to be skipped over to confirm that only the products to be skipped are those products where the current queue time is greater than that of the subsequent queue time.

15. The method of claim 1, further comprising setting a trigger rate for performing a skip operation, said trigger having a rate that depends on the WIP bubble size responding to the skipping.

16. The method of claim 15, wherein when the WIP bubble increases, the trigger rate increases when a new product enters the queue of the manufacturing toolset, and said trigger rate decreases when the WIP bubble decreases following one or more lots entering the queue of the manufacturing toolset.

17. The method of claim 15, wherein when the WIP bubble drops below the predetermined threshold and the queue in front of the current process step achieves an acceptable level, the skipping process is deactivated and a normal process is reinstated.

18. The method of claim 17 further comprising the step of continually monitoring the WIP for a manufacturing toolset, and in response to said monitoring, adjusting the skip rate.

19. A method of increasing throughput while mitigating risk in a manufacturing line by selecting products to be skipped over during high Work In Process (WIP) conditions, the method comprising the steps of:
   a) determining toolsets having work in process exceeding a predetermined threshold;
   b) for each of the toolsets, selecting the products which meet a criteria for skipping by comparing a queue time of the product to be skipped for a current process step to the queue time for the same product in a subsequent process step;
   c) identifying the product where the subsequent queue time for the current process step is greater than the queue time for the subsequent process step;
   d) skipping over the identified product and selecting another product to be evaluated; and
   e) having the selected products skip over to the toolset used in a subsequent process step ahead of the product failing to meet said criteria for skipping.

20. A program storage device readable by a machine, tangibly embodying a program of instructions executable by the machine to perform method steps for increasing throughput while mitigating risk in a manufacturing line by selecting products to be skipped over during high Work In Process (WIP) conditions, said method steps comprising:
   (a) determining toolsets having work in process exceeding a predetermined threshold;
   (b) for each of the toolsets, selecting the products which meet a criteria for skipping; and
   (c) having the selected products skip over to the toolset used in a subsequent process step ahead of the product failing to meet said criteria for skipping.

* * * * *